(12) United States Patent
Logue et al.

(10) Patent No.: US 11,472,553 B2
(45) Date of Patent: Oct. 18, 2022

(54) CEILING RETAINING ASSEMBLIES AND METHODS FOR AN INTERNAL CABIN OF A VEHICLE

(71) Applicant: THE BOEING COMPANY, Chicago, IL (US)

(72) Inventors: Adam Arthur Logue, Everett, WA (US); Bryan Charles Bundy, Mukilteo, WA (US); Jeffrey Allen Cartwright, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 392 days.

(21) Appl. No.: 16/748,952

(22) Filed: Jan. 22, 2020

(65) Prior Publication Data

US 2021/0221512 A1 Jul. 22, 2021

(51) Int. Cl.
*B64D 11/00* (2006.01)

(52) U.S. Cl.
CPC ............ *B64D 11/00* (2013.01); *B64D 11/003* (2013.01)

(58) Field of Classification Search
CPC ....... B64C 1/066; B64C 1/1446; B64D 11/00; E05B 63/0004; E05B 63/0008; E05B 17/025; Y10S 292/17; E05D 11/10; E05D 11/1007; E05D 11/1014; E05D 11/1028; E05D 11/1078; E05D 2011/1035
See application file for complete search history.

(56) References Cited

U.S. PATENT DOCUMENTS

| | | | | |
|---|---|---|---|---|
| 4,490,883 A * | 1/1985 | Gauron | ............... | E05D 15/58 16/361 |
| 8,038,184 B2 * | 10/2011 | Grigis | ............... | B64D 29/06 292/87 |
| 11,046,435 B2 * | 6/2021 | Walton | ............... | B64D 11/003 |
| 2009/0152397 A1 * | 6/2009 | LaConte | ............... | B64C 1/066 244/129.4 |
| 2017/0234037 A1 * | 8/2017 | Cassou | ............... | E05B 63/18 292/163 |

* cited by examiner

*Primary Examiner* — Richard R. Green
*Assistant Examiner* — Madison Elizabeth Dittner
(74) *Attorney, Agent, or Firm* — The Small Patent Law Group LLC; Joseph M Butscher

(57) ABSTRACT

A retaining assembly and method for use within an internal cabin of an aircraft, in which the retaining assembly includes a hinge including a biasing member. The hinge is moveable between a retaining position, in which the biasing member is configured to exert a biasing force into a top surface of a ceiling panel within an internal cabin of a vehicle to prevent the ceiling panel from upward motion, and a release position, in which the hinge is configured to be pivoted away from the ceiling panel and the biasing member is configured to be separated from the ceiling panel.

20 Claims, 10 Drawing Sheets

CEILING RETAINING ASSEMBLIES AND METHODS FOR AN INTERNAL CABIN OF A VEHICLE

FIELD OF THE DISCLOSURE

Embodiments of the present disclosure generally relate to ceiling retaining assemblies, systems, and methods, such as may be used within an internal cabin of a vehicle.

BACKGROUND OF THE DISCLOSURE

Commercial aircraft include internal cabins having passenger seats, stowage bin assemblies, and monuments, such as lavatories, galleys, closets, and the like. Ceiling panels within the internal cabin are coupled to one another, certain monuments, and/or stowage bin assemblies. The ceiling panels conceal ducts, wiring, and other components within the internal cabin.

For various reasons, ceiling panels may need to be temporarily removed or replaced. For example, certain components above the ceiling panels may be due for inspection and/or maintenance. As such, a ceiling panel may need to be removed in order to gain access to a component.

However, known retainers that secure the ceiling panels in position often do not allow for the ceiling panels to be easily removed. As an example, a monument below the ceiling panel may restrict movement of the ceiling panel. In particular, the ceiling panel may not be able to be downwardly moved as it may be blocked by the monument. Further, the retainers may not allow the ceiling panel to be upwardly moved. Therefore, the ceiling panel may need to be laterally shifted in order to be removed, which may be difficult and time-consuming. In short, the shapes and sizes of certain ceiling panels and adjacent structures within an internal cabin of an aircraft may cause a removal process of the ceiling panel to be time and labor intensive.

SUMMARY OF THE DISCLOSURE

A need exists for a system and method that facilitate quick, easy, and efficient removal of a ceiling panel. Further, a need exists for a system and method that allow for effective removal of a ceiling panel (such as a B-transition ceiling panel) that is coupled to a monument within an internal cabin of an aircraft.

With those needs in mind, certain embodiments of the present disclosure provide a retaining assembly including a hinge having a biasing member. The hinge is moveable between a retaining position, in which the biasing member is configured to exert a biasing force into a top surface of a ceiling panel within an internal cabin of a vehicle to prevent the ceiling panel from upward motion, and a release position, in which the hinge is configured to be pivoted away from the ceiling panel and the biasing member is configured to be separated from the ceiling panel.

In at least one embodiment, the retaining assembly further includes a base. A portion of the ceiling panel is configured to be sandwiched between the biasing member and the base when the hinge is in the retaining position. The retaining assembly further includes a wall connected to the base. The hinge is pivotally coupled to the wall. The wall is configured to secure the retaining assembly to a rail connected to a strongback of an overhead stowage bin assembly. For example, the wall includes one or more fastener throughholes that retain fasteners that are configured to secure the retaining assembly to the rail. In at least one embodiment, the hinge is pivotally coupled to the wall through an axle.

In at least one embodiment, the retaining assembly also includes a plunger that is configured to selectively extend into and retract from a channel of a pivot restraint spur of the hinge. Upward pivotal motion of the hinge is restrained when the plunger extends into the channel. As an example, the plunger includes a shaft having a distal end that is configured to be pushed into the channel and pulled out of the channel.

As an example, the biasing member is coupled to a pivot coupler of the hinge. The biasing member includes an extension beam extending below the pivot coupler. The extension beam is pivotally coupled to the pivot coupler through an axle. A coil spring extends between the pivot coupler and the extension beam. The coil spring is configured to bias at least a portion of the extension beam onto the top surface of the ceiling panel when the hinge is in the retaining position. The portion can include an expanded panel engagement member that is configured to abut against the top surface of the ceiling panel when the hinge is in the retaining position.

As another example, the biasing member includes a spring steel strap. The spring steel strap can include a securing segment secured to the hinge, an extension segment connected to the securing segment (wherein the extension segment outwardly and downwardly extends from the hinge), and an engagement member connected to the extension segment (wherein the engagement member is configured to engage the top surface of the ceiling panel).

Certain embodiments of the present disclosure provide a method including providing a retaining assembly including a hinge that includes a biasing member, and moving the hinge into a retaining position. Said moving the hinge into the retaining position causes the biasing member to exert a biasing force into a top surface of a ceiling panel within an internal cabin of a vehicle to prevent the ceiling panel from upward motion. The method also includes moving the hinge into a release position. Said moving the hinge into the release position pivots the hinge away from the ceiling panel and separates the biasing member from the ceiling panel.

In at least one embodiment, the method also includes extending a plunger into a channel of a pivot restraint spur of the hinge when the hinge is in the retaining position. Said extending restrains pivotal motion of the hinge. The method also includes retracting the plunger from the channel of the pivot restraint spur to allow the hinge to move into the release position.

Certain embodiments of the present disclosure provide an aircraft including an internal cabin, a stowage bin assembly within the internal cabin, a monument within the internal cabin, a ceiling panel extending between the stowage bin assembly and the monument, and a retaining assembly, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a retaining assembly for a ceiling panel of an internal cabin of a vehicle, such as a commercial aircraft. The retaining assembly allows for quick, effective, and efficient installation and removal of the ceiling panel within the internal cabin. In at least one embodiment, the retaining assembly includes a hinge clip having a biasing member. In at least one embodiment, the biasing member includes a spring. As another example, the biasing member includes a spring steel strap. The biasing member presses against a ceiling panel to keep the ceiling panel from lifting upwardly, such as during a flight of an aircraft.

Figure 1:
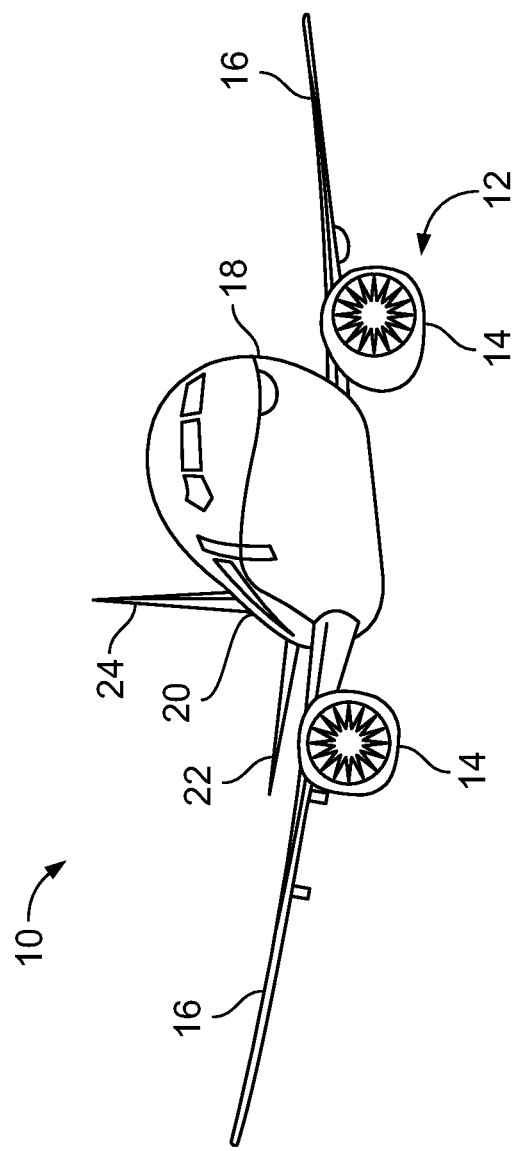
FIG. 1 illustrates a perspective front view of an aircraft, according to an embodiment of the present disclosure.

FIG. 1 illustrates a perspective top view of an aircraft 10, according to an embodiment of the present disclosure. The aircraft 10 includes a propulsion system 12 that includes two engines 14, for example. Optionally, the propulsion system 12 can include more engines 14 than shown. The engines 14 are carried by wings 16 of the aircraft 10. In other embodiments, the engines 14 can be carried by a fuselage 18 and/or an empennage 20. The empennage 20 may also support horizontal stabilizers 22 and a vertical stabilizer 24.

The fuselage 18 of the aircraft 10 defines an internal cabin, which can be defined by interior sidewall panels that connect to a ceiling and a floor. The internal cabin can include a flight deck, one or more work sections (for example, galleys, personnel carry-on baggage areas, and the like), one or more passenger sections (for example, first class, business class, and coach sections), and an aft section. Each of the sections can be separated by a cabin transition area, which can include one or more class divider assemblies. Overhead stowage bin assemblies can be positioned throughout the internal cabin.

Alternatively, instead of an aircraft, embodiments of the present disclosure can be used with various other vehicles, such as automobiles, buses, locomotives and train cars, seacraft, spacecraft, and the like.

Figure 2A:
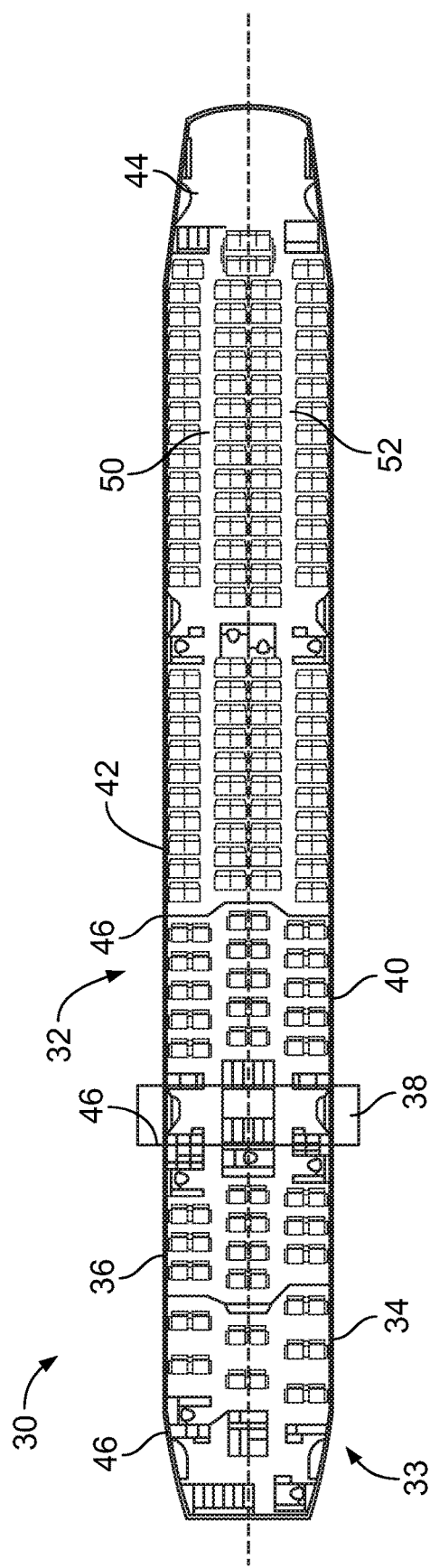
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 can be within a fuselage 32 of the aircraft. For example, one or more fuselage walls can define an interior of the internal cabin 30. The interior of the internal cabin 30 is defined by sidewall panels that connect to a ceiling and a floor. The internal cabin 30 includes multiple sections, including a front section 33, a first class section 34, a business class section 36, a front galley station 38, an expanded economy or coach section 40, a standard economy or coach section 42, and an aft section 44, which can include multiple monuments, such as lavatories, closets, and galley stations. It is to be understood that the internal cabin 30 can include more or less sections than shown. For example, the internal cabin 30 may not include a first class section, and may include more or less galley stations than shown. Each of the sections can be separated by a cabin transition area 46.

As shown in FIG. 2A, the internal cabin 30 includes two aisles 50 and 52 that lead to the aft section 44. Optionally, the internal cabin 30 can have less or more aisles than shown. For example, the internal cabin 30 can include a single aisle that extends through the center of the internal cabin 30 that leads to the aft section 44.

Figure 2B:
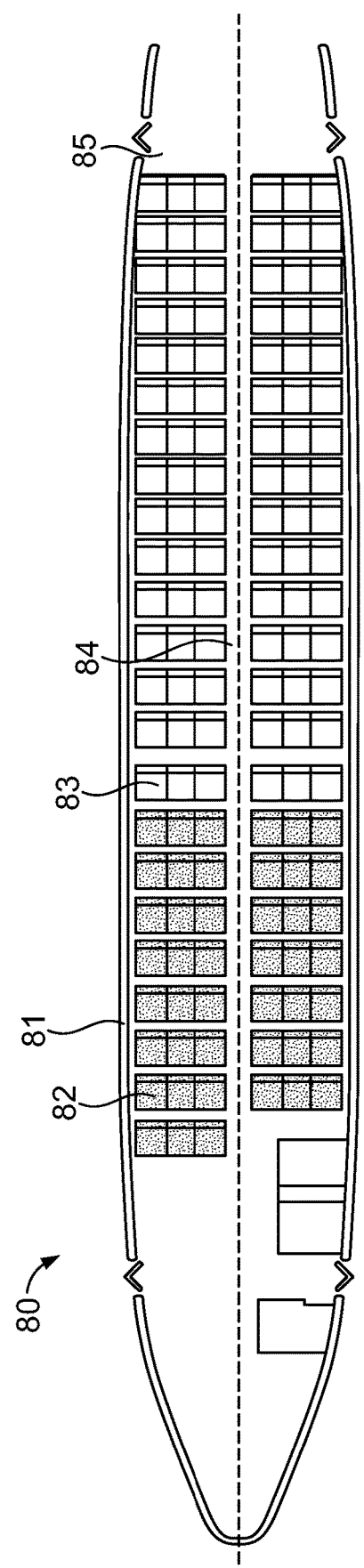
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 can be within a fuselage 81 of the aircraft. For example, one or more fuselage walls can define the interior of the internal cabin 80. The internal cabin 80 includes multiple sections, including a main cabin 82 having passenger seats 83, and an aft section 85 behind the main cabin 82. It is to be understood that the internal cabin 80 can include more or less sections than shown.

The internal cabin 80 can include a single aisle 84 that leads to the aft section 85. The single aisle 84 can extend through the center of the internal cabin 80 that leads to the aft section 85. For example, the single aisle 84 can be coaxially aligned with a central longitudinal plane of the internal cabin 80.

Figure 3:
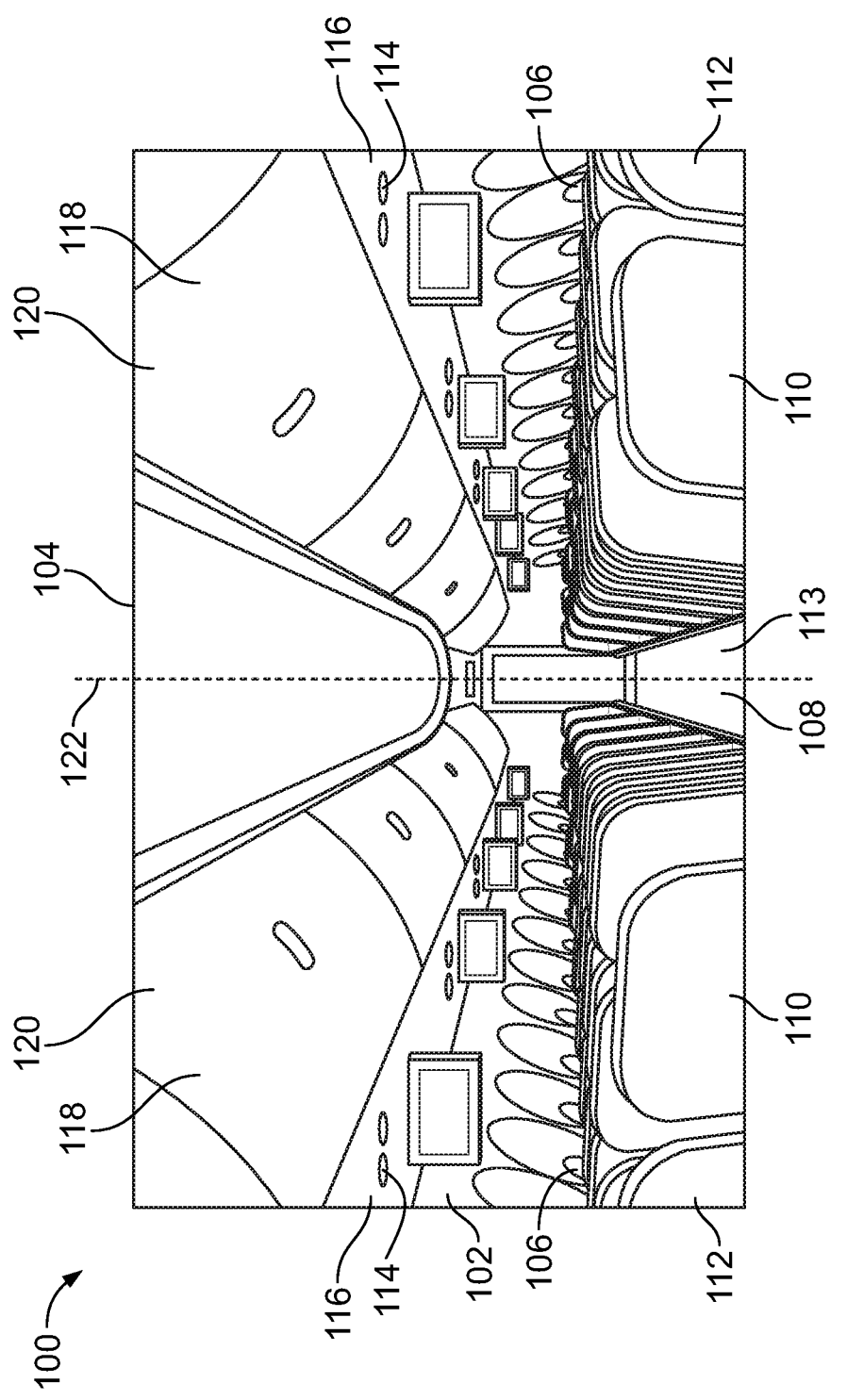
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard sidewalls 102 connected to a ceiling 104, which can include numerous ceiling panels, such as B-transition ceiling panels proximate to monuments, such as lavatories. Windows 106 can be formed within the outboard sidewalls 102. A floor 108 supports rows of seats 110. As shown in FIG. 3, a row 112 can include two seats 110 on either side of an aisle 113. However, the row 112 can include more or less seats 110 than shown. Additionally, the internal cabin 100 can include more aisles than shown.

Passenger service units (PSUs) 114 are secured between an outboard sidewall 102 and the ceiling 104 on either side of the aisle 113. The PSUs 114 extend between a front end and rear end of the internal cabin 100. For example, a PSU 114 can be positioned over each seat 110 within a row 112. Each PSU 114 can include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard sidewall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 can include a pivot bin or bucket 120 pivotally secured to a strongback (hidden from view in FIG. 3). The overhead stowage bin assemblies 118 can be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 can be outboard in relation to a stowage bin assembly 118.

Figure 4:
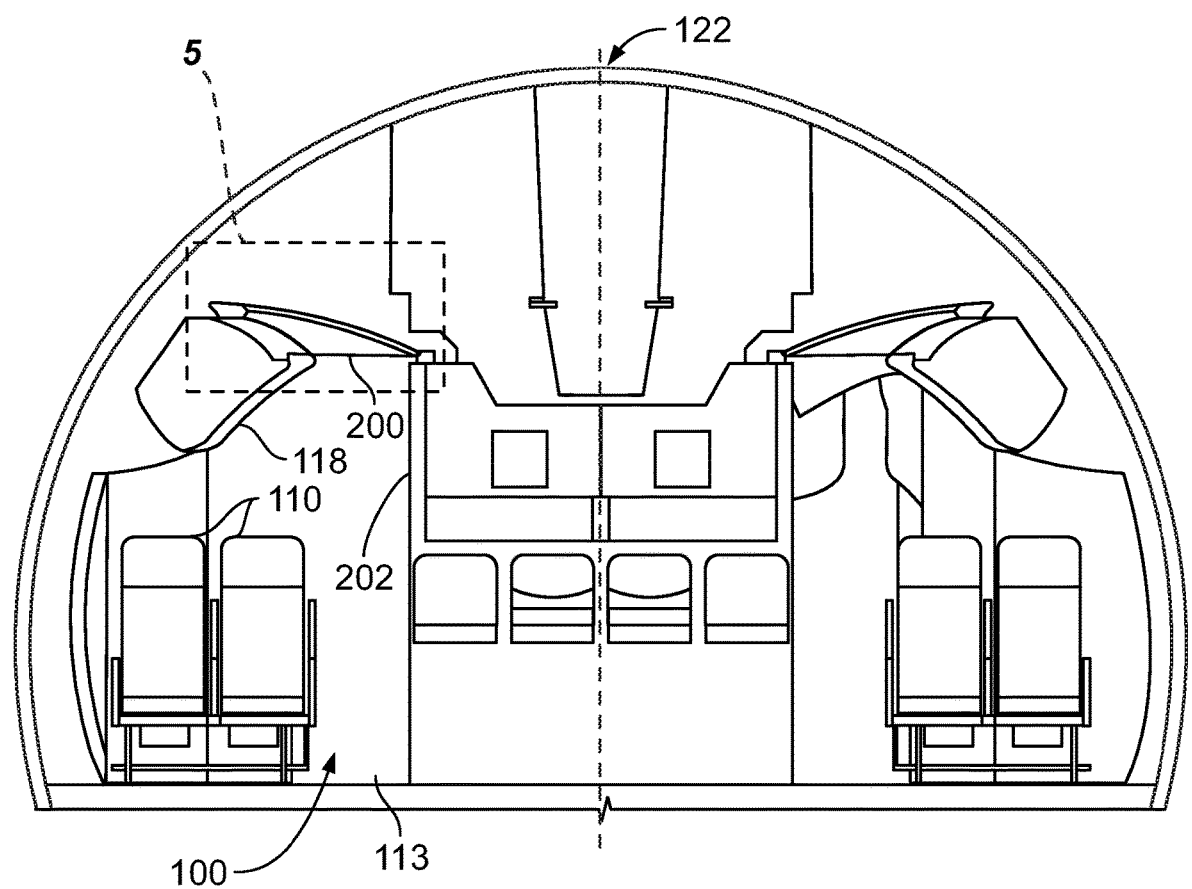
FIG. 4 illustrates an interior view of an internal cabin looking aft, according to an embodiment of the present disclosure.

FIG. 4 illustrates an interior view of an internal cabin 100 looking aft, according to an embodiment of the present disclosure. The internal cabin 100 includes a ceiling panel 200 over an aisle 113. The ceiling panel 200 is coupled to a stowage bin assembly 118 (such as to a strongback of the stowage bin assembly 118) over seats 110 on one side of the aisle 113, and a monument 202 on an opposite side of the aisle 113. In at least one embodiment, the monument 202 is a lavatory, a closet, a galley, a transition wall, or the like, which is inboard from the aisle 113. In at least one embodiment, the ceiling panel 200 is a B-transition ceiling panel.

Figure 5:
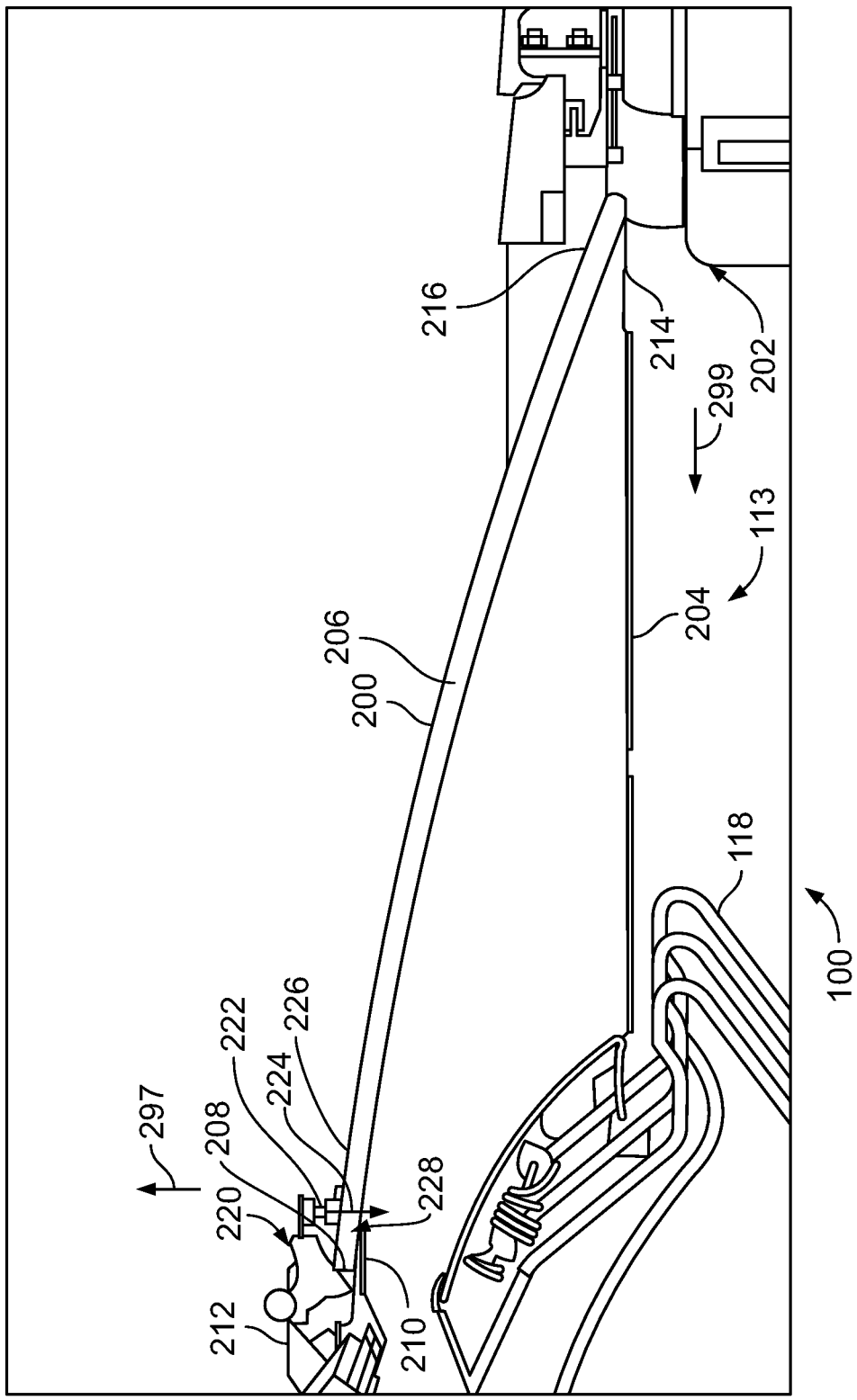
FIG. 5 illustrates a front view of a ceiling panel coupled to a stowage bin assembly and a monument within the internal cabin of FIG. 4.

FIG. 5 illustrates a front view of the ceiling panel 200 coupled to the stowage bin assembly 118 and the monument 202 within the internal cabin 100 of FIG. 4. The ceiling panel 200 includes a lower segment 204 that is disposed above the aisle 113. The lower segment 204 connects to an arcuate upper segment 206. An outboard end 208 of the upper segment 206 rests on a beam, such as a cove 210 that connects to an upright rail 212. The rail 212 can be part of, or other otherwise connected to, a strongback of the stowage bin assembly 118. An inboard end 214 of the upper segment 206 secures to the monument 202 through a latch 216.

As noted, in at least one embodiment, the ceiling panel 200 is a B-transition ceiling panel. Optionally, the ceiling panel 200 can be various other ceiling panels 200 within the internal cabin 100. The ceiling panel 200 can be sized and shaped differently than shown in FIGS. 4 and 5.

At least one retaining assembly 220 secures the ceiling panel 200 in position, such as with respect to the stowage bin assembly 118. In at least one embodiment, the retaining assembly 220 is secured to the rail 212, such as through one or more bolts. The retaining assembly 220 includes a biasing member 222 that exerts a biasing force in the direction of arrow 224 into a top surface 226 of the ceiling panel 200, thereby ensuring that an edge 228 of the outboard end 208 is securely sandwiched between the biasing member 222 and a base of the retaining assembly 220.

As shown in FIG. 5, the monument 202 provides structure that can prevent the inboard end 214 of the ceiling panel 200 from being moved downwardly when unlatched from the latch 216. As described herein, the retaining assembly 220 is configured to be moved between a retaining position (as shown in FIG. 5), in which the retaining assembly 220 retains the outboard end 208 in position, and a release position, in which a hinge of the retaining assembly 220 is disengaged from (for example, separated from) the ceiling panel 200. As such, the outboard end 208 may be upwardly moved (for example, pivoted) in the direction of arrow 297, and the inboard end 214 may be inwardly shifted in the direction of arrow 299 to clear the monument 202. As such, the ceiling panel 200 may be moved into a removal position, and removed into the aisle 113.

Figure 6:
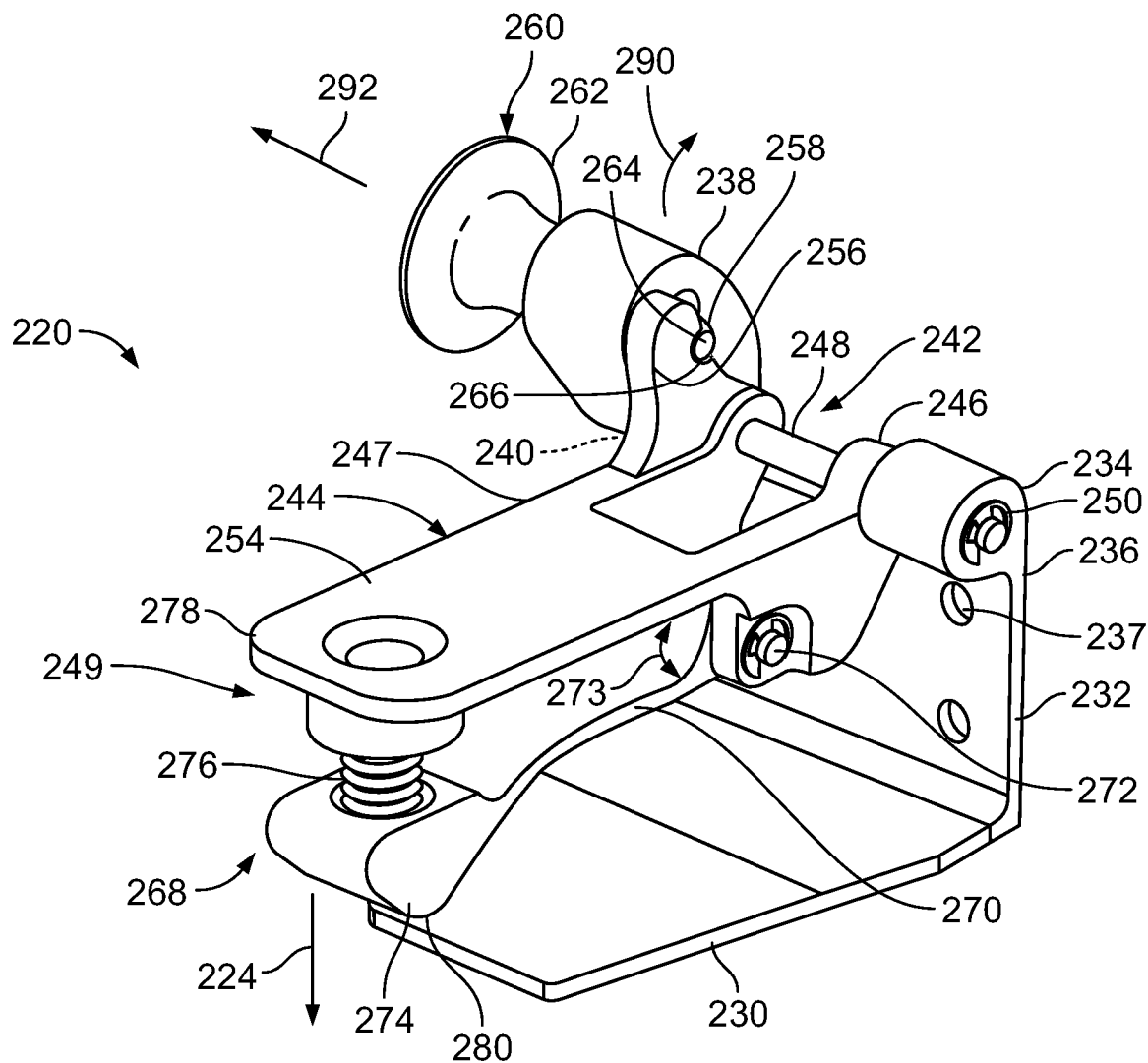
FIG. 6 illustrates a perspective first lateral view of a retaining assembly, according to an embodiment of the present disclosure.
Figure 7:
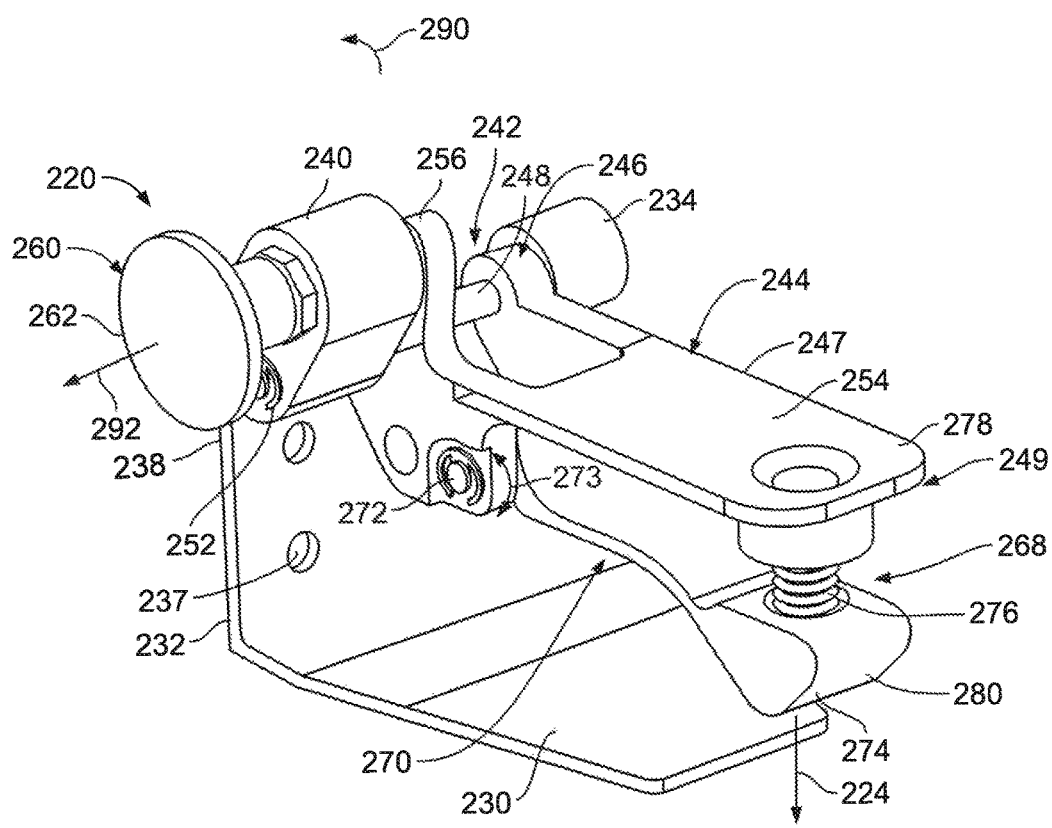
FIG. 7 illustrates a perspective second lateral view of the retaining assembly.
Figure 8:
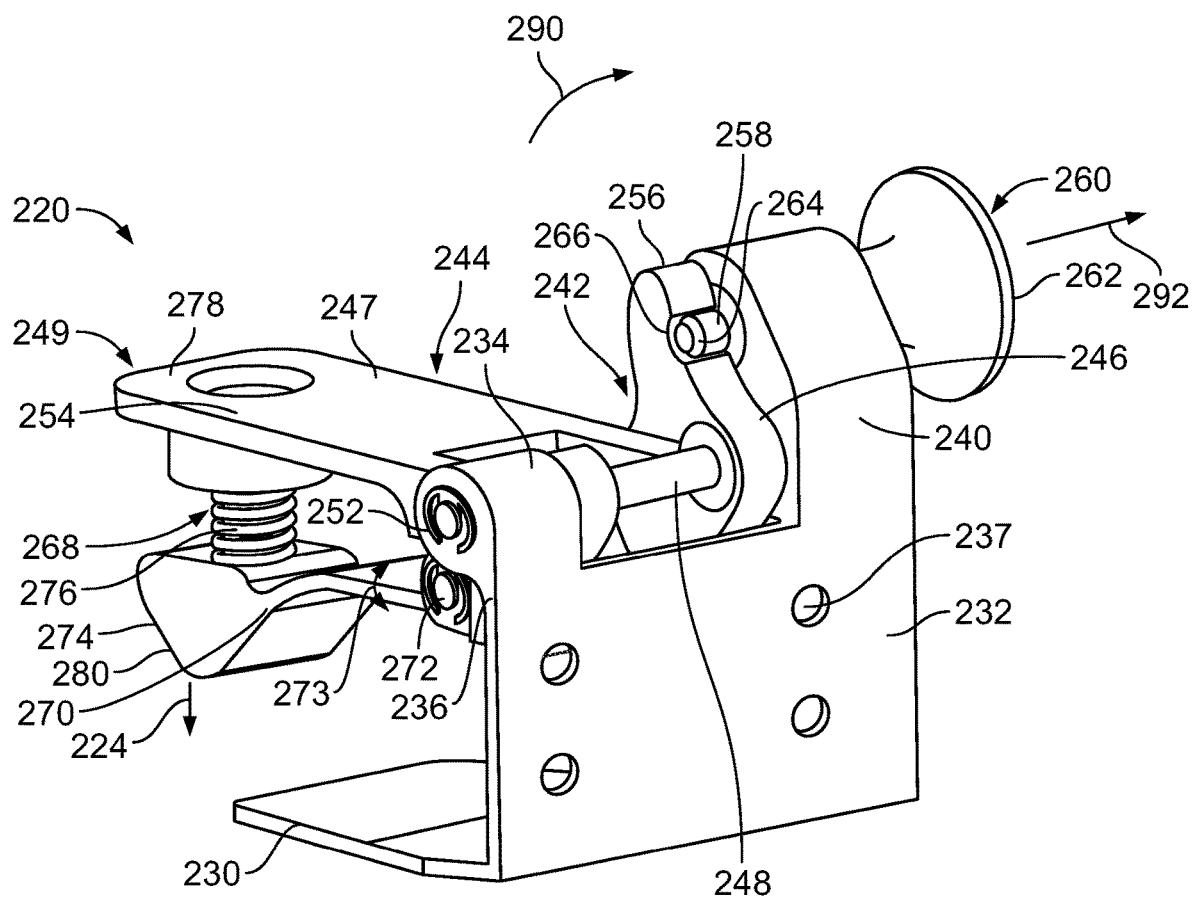
FIG. 8 illustrates a perspective rear view of the retaining assembly.

FIG. 6 illustrates a perspective first lateral view of the retaining assembly 220, according to an embodiment of the present disclosure. FIG. 7 illustrates a perspective second lateral view (opposite from the first lateral view) of the retaining assembly 220. FIG. 8 illustrates a perspective rear view of the retaining assembly 220.

Referring to FIGS. 6-8, the retaining assembly 220 includes the base 230, such as a flat beam. The base 230 connects to a wall 232, which can be perpendicular to the base 230. The wall 232 includes one or more fastener through-holes 237, which are configured to receive fasteners (such as bolts) that secure the retaining assembly 220 to a structure, such as the rail 212 (shown in FIG. 5).

An axle retaining sleeve 234 extends upwardly from a first upper lateral portion 236 of the wall 232. A plunger retaining sleeve 240 extends upwardly from a second upper lateral portion 238 (opposite from the first upper lateral portion 236) of the wall 232. The axle retaining sleeve 234 and the plunger retaining sleeve 240 are separated by a gap 242.

A hinge 244 is pivotally coupled to the wall 232. The hinge 244 includes a pivot coupler 247 that pivotally couples the hinge 244, such as a first end 246 thereof, to the wall 232 through an axle 248 that is rotatably retained within an axle bearing 250 of the axle retaining sleeve 234 and an axle bearing 252 of the plunger retaining sleeve 240. The pivot coupler 247 includes a main beam 254 that extends away from the wall 232. The pivot coupler 247 further includes a pivot restraint spur 256 that upwardly extends from a top surface proximate the first end 246 of the hinge 244, and abuts against the plunger retaining sleeve 240.

The plunger retaining sleeve 240 slidably retains a shaft 258 of a plunger 260, which further includes an engagement handle 262 that connects to the shaft 258. When the plunger 260 is in an extended position that restrains movement of the hinge 244, a distal end 264 of the shaft 258 extends into a reciprocal channel 266 of the pivot restraint spur 256. The plunger 260 is configured to selectively extend into and retract from the channel 266 of the pivot restraint spur 256 of the hinge 244. Upward pivotal motion of the hinge 244 is restrained when the plunger 260 extends into the channel 266.

A biasing member 268 is coupled to the pivot coupler 247. The biasing member 268 includes an extension beam 270 that extends below the pivot coupler 247. The extension beam 270 is pivotally coupled to the pivot coupler 247 through an axle 272 proximate to the first end 246. The extension beam 270 includes an expanded panel engagement member 274 that is distally located from the first end 246. A spring 276, such as a coil spring, extends between an end 278 of the pivot coupler 247 and the panel engagement member 274 at a second end 249 of the hinge 244. The spring 276 biases the panel engagement member 274 in the direction of arrow 224 towards the base 230.

Referring to FIGS. 5-8, the edge 228 of the ceiling panel 200 is sandwiched between the panel engagement member 274 and the base 230. The spring 276 exerts the biasing force into the edge 228, thereby securely trapping the ceiling panel 200 in position when the plunger 260 is in the extended position, which restrains pivotal motion of the hinge 244. The extension beam 270 is pivotal in relation to the pivot coupler 247 via the axle 272 in the directions of arc 273. As such, as the spring 276 compresses and expands, the extension beam 270 responds through the pivotal motion about the axle 272.

In at least one embodiment, the panel engagement member 274 includes a rounded tip 280. The rounded tip 280 provides a smooth surface that is unlikely to scratch or dig into the ceiling panel 200. Optionally, the panel engagement member 274 can be sized and shaped differently than shown.

Referring to FIGS. 5-8, when the plunger 260 is in the extended position, the hinge 244 is constrained from upward pivot motion. In particular, the distal end 264 of the shaft 258 of the plunger 260 is retained within the reciprocal channel 266, thereby blocking upward pivotal motion of the hinge 244 in the direction of arc 290.

In order to disengage the hinge 244 from the edge 228 of the ceiling panel 200, the plunger 260 is pulled outwardly in the direction of arrow 292 until the shaft 258 is removed from the reciprocal channel 266 so that the shaft 258 no longer engages the pivot restraint spur 256. As such, the hinge 244 may be pivoted upwardly in the direction of arc 290 so that the biasing member 268 releases from the edge 228 of the ceiling panel 200. Therefore, the outboard end 208 of the ceiling panel 200 can be lifted upwardly (for example, pivoted) in the direction of arrow 297. Because the hinge 244 pivotally releases from the ceiling panel 200, there is no portion of the retaining assembly 220 above the ceiling panel 200.

In contrast to known retainers, the retaining assembly 230 is moveable between a retaining position, in which the hinge 244 is restrained from upward pivot motion and the biasing member 268 exerts a biasing force into the ceiling panel, and a release position, in which the hinge 244 is pivoted upwardly away from the ceiling panel 200. When the retaining assembly 230 is in the release position such that the hinge 244 is no longer over the ceiling panel 200, the ceiling panel 200 can be lifted upwardly, in contrast to known retainers that inhibit upward motion of the ceiling panel 200. In at least one embodiment, the ceiling panel 200 can first be unlatched from the latch 216, the retaining assembly 230 may be moved into the release position, and then the ceiling panel 200 can be moved upwardly in the direction of arrow 297, and downwardly angled or otherwise shifted to remove the ceiling panel 200 from the stowage bin assembly 118 and the monument 202.

As described herein, embodiments of the present disclosure provide the retaining assembly 220 including the hinge 244 having the biasing member 268. The hinge 244 of the retaining assembly 220 is moveable between a retaining position, in which the biasing member 268 is urged into a top surface of the ceiling panel 200 to prevent the ceiling panel 200 from upward motion, and a release position, in which the hinge 244 is pivoted away from the ceiling panel 200 and the biasing member 268 is disengaged from the ceiling panel 200. In the retaining position, the plunger 260 engages the pivot restraint spur 256, which restrains upward pivotal motion of the hinge 244.

Figure 9:
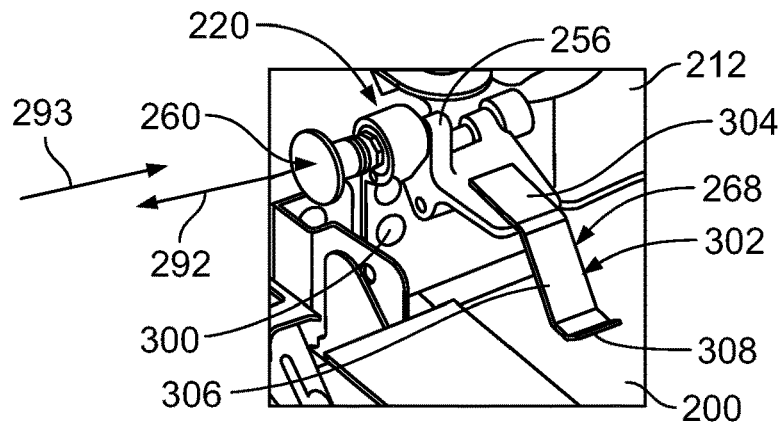
FIG. 9 illustrates a perspective front view of a retaining assembly in a retaining position with respect to a ceiling panel, according to an embodiment of the present disclosure.

FIG. 9 illustrates a perspective front view of a retaining assembly 220 in a retaining position with respect to a ceiling panel 200, according to an embodiment of the present disclosure. As shown, the retaining assembly 220 is secured to the rail 212, such as through fasteners 300.

The retaining assembly 220 is similar to the retaining assembly 220 shown in FIGS. 6-8, except that the biasing member 268 includes a spring steel strap 302. The spring steel strap 302 includes a securing segment 304 secured to the hinge 244. The securing segment 304 connects to an extension segment 306 that outwardly and downwardly extends from the hinge 244. The extension segment 306 connects to an engagement member 308, such as an upturned end segment, which is configured to directly engage (for example, abut against) a top surface of the ceiling panel 200. The spring steel strap 302 exhibits a spring force constant that exerts a biasing force into the ceiling panel 200 when the retaining assembly 220 is in the retaining position as shown in FIG. 9. In order to disengage the retaining assembly 220 from the ceiling panel 200, the plunger 260 is outwardly pulled in the direction of arrow 292, as described above, thereby disengaging from the pivot restraint spur 256. As such, the hinge 244 can be upwardly pivoted away from the ceiling panel 200.

Figure 10:
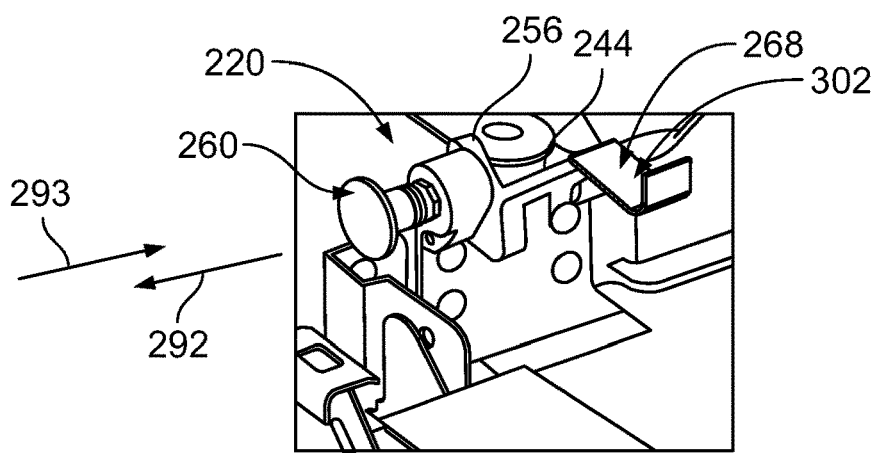
FIG. 10 illustrates a perspective front view of the retaining assembly in an intermediate position with respect to the ceiling panel.

FIG. 10 illustrates a perspective front view of the retaining assembly 220 in an intermediate position with respect to the ceiling panel 200. As shown, the retaining assembly 220 pivots away from the ceiling panel 200.

Figure 11:
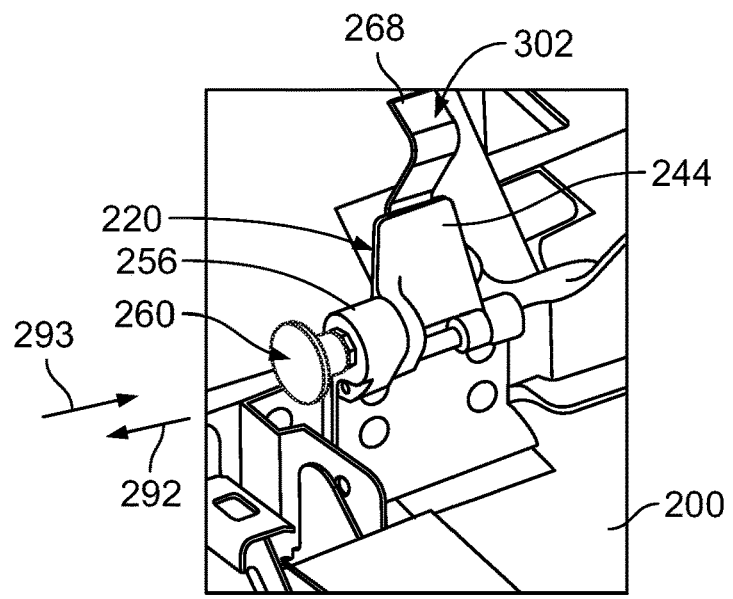
FIG. 11 illustrates a perspective front view of the retaining assembly in a release position with respect to the ceiling panel.

FIG. 11 illustrates a perspective front view of the retaining assembly 220 in the release position with respect to the ceiling panel 200. In the release position, the 244 is no longer above the ceiling panel 200. As such, the ceiling panel 200 may be upwardly lifted.

In order to secure the ceiling panel 200 in position, the process is reversed. For example, the hinge 244 is downwardly pivoted towards the ceiling panel 200 until the biasing member 268 engages a top surface of the ceiling panel 200. The plunger 260 is then pushed inwardly in the direction of arrow 293 so that the plunger 260 re-engages the pivot restraint spur 256, thereby restraining the hinge 244 from upward pivotal motion.

Figure 12:
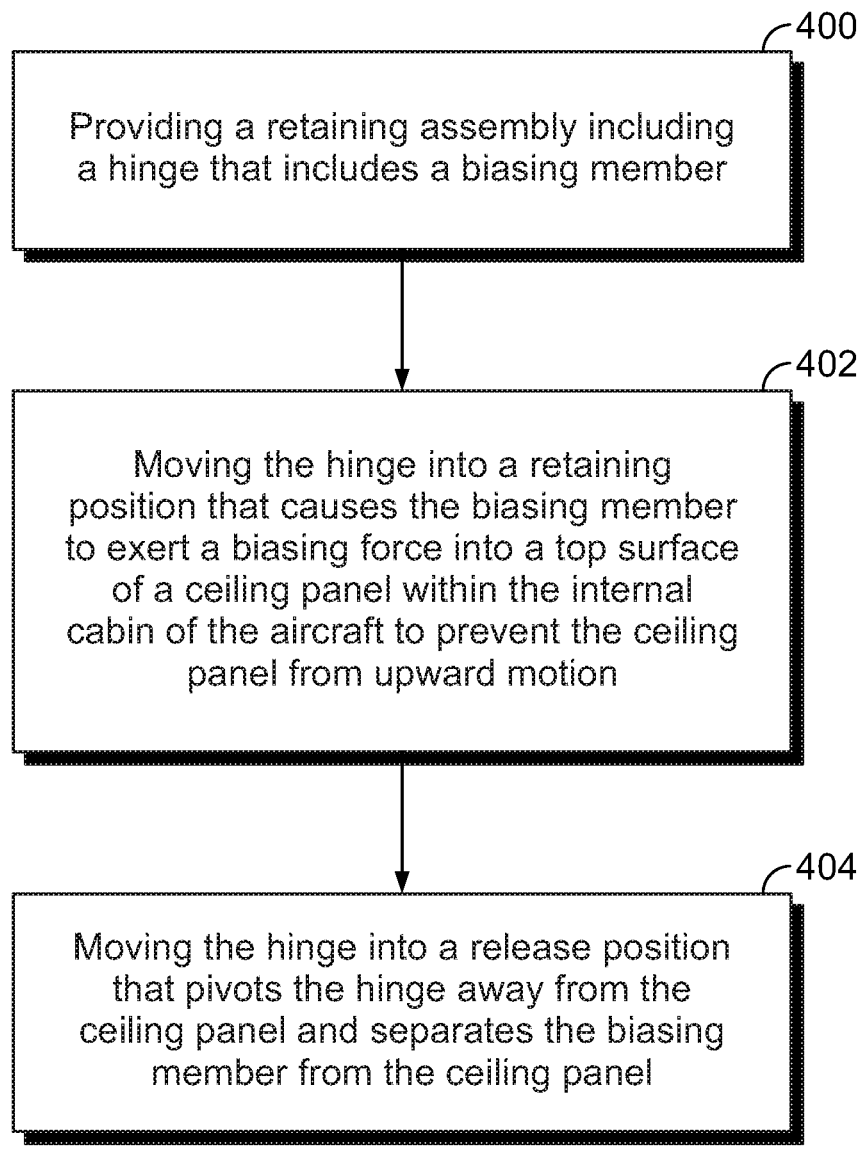
FIG. 12 illustrates a flow chart of a retaining method for a ceiling panel within an internal cabin of an aircraft, according to an embodiment of the present disclosure.

FIG. 12 illustrates a flow chart of a retaining method for a ceiling panel within an internal cabin of an aircraft, according to an embodiment of the present disclosure. The method includes providing (400) a retaining assembly including a hinge that includes a biasing member, and moving (402) the hinge into a retaining position. The moving (402) the hinge into the retaining position causes the biasing member to exert a biasing force into a top surface of a ceiling panel within the internal cabin of the aircraft to prevent the ceiling panel from upward motion. The method also includes moving (404) the hinge into a release position. The moving (404) the hinge into the release position pivots the hinge away from the ceiling panel and separates the biasing member from the ceiling panel.

In at least one embodiment, the method also includes sandwiching a portion of the ceiling panel between the biasing member and a base of the retaining assembly when the hinge is in the retaining position.

In at least one embodiment, the method includes pivotally coupling the hinge to a wall of the retaining assembly, and securing the wall to a rail connected to a strongback of an overhead stowage bin assembly.

In at least one embodiment, the method also includes extending a plunger into a channel of a pivot restraint spur of the hinge when the hinge is in the retaining position. The extending restrains pivotal motion of the hinge. The method also includes retracting the plunger from the channel of the pivot restraint spur to allow the hinge to move into the release position.

In at least one embodiment, the moving the hinge into the retaining position includes biasing, by a coil spring of the biasing member, the portion of the extension beam onto the top surface of the ceiling panel when the hinge is in the retaining position. As another example, the moving the hinge into the retaining position includes biasing a spring steel strap of the biasing member onto the top surface of the ceiling panel when the hinge is in the retaining position.

Further, the disclosure comprises embodiments according to the following clauses:

Clause 1. A retaining assembly comprising:
a hinge comprising a biasing member, wherein the hinge is moveable between a retaining position, in which the biasing member is configured to exert a biasing force into a top surface of a ceiling panel within an internal cabin of a vehicle to prevent the ceiling panel from upward motion, and a release position, in which the hinge is configured to be pivoted away from the ceiling panel and the biasing member is configured to be separated from the ceiling panel.

Clause 2 The retaining assembly of Clause 1, further comprising:
a base, wherein a portion of the ceiling panel is configured to be sandwiched between the biasing member and the base when the hinge is in the retaining position; and
a wall connected to the base, wherein the hinge is pivotally coupled to the wall, and wherein the wall is configured to secure the retaining assembly to a rail connected to a strongback of an overhead stowage bin assembly.

Clause 3. The retaining assembly of either of Clauses 1 or 2, wherein the wall comprises one or more fastener through-holes that retain fasteners that are configured to secure the retaining assembly to the rail.

Clause 4. The retaining assembly of any of Clauses 1-3, wherein the hinge is pivotally coupled to the wall through an axle.

Clause 5. The retaining assembly of any of Clauses 1-4, further comprising a plunger that is configured to selectively extend into and retract from a channel of a pivot restraint spur of the hinge, wherein upward pivotal motion of the hinge is restrained when the plunger extends into the channel.

Clause 6. The retaining assembly of any of Clauses 1-5, wherein the plunger comprises a shaft having a distal end that is configured to be pushed into the channel and pulled out of the channel.

Clause 7. The retaining assembly of any of Clauses 1-6, wherein the biasing member is coupled to a pivot coupler of the hinge, and wherein the biasing member comprises:
an extension beam extending below the pivot coupler, wherein the extension beam is pivotally coupled to the pivot coupler through an axle; and
a coil spring extending between the pivot coupler and the extension beam, wherein the coil spring is configured to bias at least a portion of the extension beam onto the top surface of the ceiling panel when the hinge is in the retaining position.

Clause 8. The retaining assembly of any of Clauses 1-7, wherein the portion comprises an expanded panel engagement member that is configured to abut against the top surface of the ceiling panel when the hinge is in the retaining position.

Clause 9. The retaining assembly of any of Clauses 1-8, wherein the biasing member comprises a spring steel strap.

Clause 10. The retaining assembly of any of Claims 1-9, wherein the spring steel strap comprises:
a securing segment secured to the hinge;
an extension segment connected to the securing segment, wherein the extension segment outwardly and downwardly extends from the hinge; and
an engagement member connected to the extension segment, wherein the engagement member is configured to engage the top surface of the ceiling panel.

Clause 11. An aircraft comprising:
an internal cabin;
a stowage bin assembly within the internal cabin;
a monument within the internal cabin;
a ceiling panel extending between the stowage bin assembly and the monument; and
a retaining assembly according to any of claims 1-10.

Clause 11. A method comprising:
providing a retaining assembly comprising a hinge that includes a biasing member;
moving the hinge into a retaining position, wherein said moving the hinge into the retaining position causes the biasing member to exert a biasing force into a top surface of a ceiling panel within an internal cabin of a vehicle to prevent the ceiling panel from upward motion; and
moving the hinge into a release position, wherein said moving the hinge into the release position pivots the hinge away from the ceiling panel and separates the biasing member from the ceiling panel.

Clause 12. The method of Clause 11, further comprising sandwiching a portion of the ceiling panel between the biasing member and a base of the retaining assembly when the hinge is in the retaining position.

Clause 13. The method either Clause 11 or 12, further comprising:
pivotally coupling the hinge to a wall of the retaining assembly; and
securing the wall to a rail connected to a strongback of an overhead stowage bin assembly.

Clause 14. The method of any of Clauses 11-13, further comprising
extending a plunger into a channel of a pivot restraint spur of the hinge when the hinge is in the retaining position, wherein said extending restrains pivotal motion of the hinge; and
retracting the plunger from the channel of the pivot restraint spur to allow the hinge to move into the release position.

Clause 15. The method of any of Claims 11-14, wherein said moving the hinge into the retaining position comprises biasing, by a coil spring of the biasing member, the portion of the extension beam onto the top surface of the ceiling panel when the hinge is in the retaining position.

Clause 16. The method of any of Clauses 11-15, wherein said moving the hinge into the retaining position comprises biasing a spring steel strap of the biasing member onto the top surface of the ceiling panel when the hinge is in the retaining position.

As described herein, embodiments of the present disclosure provide systems and methods that facilitate quick, easy, and efficient removal of a ceiling panel within an internal cabin of an aircraft. Further, embodiments of the present disclosure provide systems and methods that allow for effective removal of a ceiling panel (such as a B-transition ceiling panel) that is coupled to a monument within an internal cabin of an aircraft.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A retaining assembly comprising:
   a hinge comprising a biasing member, wherein the hinge is moveable between a retaining position, in which the biasing member is configured to exert a biasing force into a top surface of a ceiling panel within an internal cabin of a vehicle to prevent the ceiling panel from upward motion, and a release position, in which the hinge is configured to be pivoted away from the ceiling panel and the biasing member is configured to be separated from the ceiling panel; and
   a plunger that is configured to selectively extend into and retract from a channel of a pivot restraint spur of the hinge, wherein upward pivotal motion of the hinge is restrained when the plunger extends into the channel.

2. The retaining assembly of claim 1, further comprising:
   a base, wherein a portion of the ceiling panel is configured to be sandwiched between the biasing member and the base when the hinge is in the retaining position; and
   a wall connected to the base, wherein the hinge is pivotally coupled to the wall, and wherein the wall is configured to secure the retaining assembly to a rail connected to a strongback of an overhead stowage bin assembly.

3. The retaining assembly of claim 2, wherein the wall comprises one or more fastener through-holes that retain fasteners that are configured to secure the retaining assembly to the rail.

4. The retaining assembly of claim 2, wherein the hinge is pivotally coupled to the wall through an axle.

5. The retaining assembly of claim 1, wherein the plunger comprises a shaft having a distal end that is configured to be pushed into the channel and pulled out of the channel.

6. The retaining assembly of claim 1, wherein the biasing member is coupled to a pivot coupler of the hinge, and wherein the biasing member comprises:
   an extension beam extending below the pivot coupler, wherein the extension beam is pivotally coupled to the pivot coupler through an axle; and
   a coil spring extending between the pivot coupler and the extension beam, wherein the coil spring is configured to bias at least a portion of the extension beam onto the top surface of the ceiling panel when the hinge is in the retaining position.

7. The retaining assembly of claim 6, wherein the portion comprises an expanded panel engagement member that is configured to abut against the top surface of the ceiling panel when the hinge is in the retaining position.

8. The retaining assembly of claim 1, wherein the biasing member comprises a spring steel strap.

9. The retaining assembly of claim 8, wherein the spring steel strap comprises:
   a securing segment secured to the hinge;
   an extension segment connected to the securing segment, wherein the extension segment outwardly and downwardly extends from the hinge; and
   an engagement member connected to the extension segment, wherein the engagement member is configured to engage the top surface of the ceiling panel.

10. A method comprising:
    providing a retaining assembly comprising a hinge that includes a biasing member;
    moving the hinge into a retaining position, wherein said moving the hinge into the retaining position causes the biasing member to exert a biasing force into a top surface of a ceiling panel within an internal cabin of a vehicle to prevent the ceiling panel from upward motion;
    moving the hinge into a release position, wherein said moving the hinge into the release position pivots the hinge away from the ceiling panel and separates the biasing member from the ceiling panel; and
    extending a plunger into a channel of a pivot restraint spur of the hinge when the hinge is in the retaining position, wherein said extending restrains pivotal motion of the hinge; and retracting the plunger from the channel of the pivot restraint spur to allow the hinge to move into the release position.

11. The method of claim 10, further comprising sandwiching a portion of the ceiling panel between the biasing member and a base of the retaining assembly when the hinge is in the retaining position.

12. The method of claim 10, further comprising:
pivotally coupling the hinge to a wall of the retaining assembly; and
securing the wall to a rail connected to a strongback of an overhead stowage bin assembly.

13. The method of claim 10, wherein said moving the hinge into the retaining position comprises biasing, by a coil spring of the biasing member, the portion of the extension beam onto the top surface of the ceiling panel when the hinge is in the retaining position.

14. The method of claim 10, wherein said moving the hinge into the retaining position comprises biasing a spring steel strap of the biasing member onto the top surface of the ceiling panel when the hinge is in the retaining position.

15. An aircraft comprising:
an internal cabin;
a stowage bin assembly within the internal cabin;
a monument within the internal cabin;
a ceiling panel extending between the stowage bin assembly and the monument; and
a retaining assembly comprising:
a hinge comprising a biasing member, wherein the hinge is moveable between a retaining position, in which the biasing member exerts a biasing force into a top surface of the ceiling panel to prevent the ceiling panel from upward motion, and a release position, in which the hinge is pivoted away from the ceiling panel and the biasing member is separated from the ceiling panel;
a base, wherein a portion of the ceiling panel is sandwiched between the biasing member and the base when the hinge is in the retaining position;
a wall connected to the base, wherein the hinge is pivotally coupled to the wall, and wherein the wall secures the retaining assembly to a rail connected to a strongback of an overhead stowage bin assembly; and
a plunger that is configured to selectively extend into and retract from a channel of a pivot restraint spur of the hinge, wherein upward pivotal motion of the hinge is restrained when the plunger extends into the channel.

16. The aircraft of claim 15, wherein the biasing member is coupled to a pivot coupler of the hinge, and wherein the biasing member comprises:
an extension beam extending below the pivot coupler, wherein the extension beam is pivotally coupled to the pivot coupler through an axle; and
a coil spring extending between the pivot coupler and the extension beam, wherein the coil spring biases at least a portion of the extension beam onto the top surface of the ceiling panel when the hinge is in the retaining position.

17. The aircraft of claim 15, wherein the biasing member comprises a spring steel strap.

18. The aircraft of claim 17, wherein the spring steel strap comprises:
a securing segment secured to the hinge;
an extension segment connected to the securing segment, wherein the extension segment outwardly and downwardly extends from the hinge; and
an engagement member connected to the extension segment, wherein the engagement member is configured to engage the top surface of the ceiling panel.

19. The aircraft of claim 15, wherein the wall comprises one or more fastener through-holes that retain fasteners that are configured to secure the retaining assembly to the rail.

20. The aircraft of claim 15, wherein the hinge is pivotally coupled to the wall through an axle.

* * * * *